US007991161B2

(12) United States Patent
Chen

(10) Patent No.: US 7,991,161 B2
(45) Date of Patent: Aug. 2, 2011

(54) SYSTEM AND METHOD FOR AUTOMATIC SECURITY AUTHENTICATION IN WIRELESS NETWORKS

(75) Inventor: Po-Fei Chen, Taiwan (TW)

(73) Assignee: Panasonic Corporation, Osaka (JP)

( * ) Notice: Subject to any disclaimer, the term of this patent is extended or adjusted under 35 U.S.C. 154(b) by 983 days.

(21) Appl. No.: 11/909,177

(22) PCT Filed: Mar. 17, 2006

(86) PCT No.: PCT/JP2006/305888
§ 371 (c)(1),
(2), (4) Date: Sep. 20, 2007

(87) PCT Pub. No.: WO2006/101183
PCT Pub. Date: Sep. 28, 2006

(65) Prior Publication Data
US 2009/0064283 A1    Mar. 5, 2009

(30) Foreign Application Priority Data

Mar. 21, 2005    (CN) .......................... 2005 1 0055952

(51) Int. Cl.
*H04L 9/00* (2006.01)
*H04M 11/00* (2006.01)
(52) U.S. Cl. ....................................... 380/272; 455/403
(58) Field of Classification Search .................. 380/272; 455/403
See application file for complete search history.

(56) References Cited

U.S. PATENT DOCUMENTS

| 7,526,762 | B1* | 4/2009 | Astala et al. .................. 717/171 |
| 7,650,112 | B2* | 1/2010 | Utsumi et al. ............... 455/11.1 |
| 7,664,036 | B2* | 2/2010 | Bye ................................ 370/237 |
| 2001/0053683 | A1* | 12/2001 | Murayama et al. ........... 455/406 |
| 2002/0147819 | A1* | 10/2002 | Miyakoshi et al. ........... 709/228 |
| 2003/0119484 | A1* | 6/2003 | Adachi et al. .................. 455/411 |
| 2004/0042421 | A1* | 3/2004 | Mahany ......................... 370/320 |
| 2004/0064550 | A1* | 4/2004 | Sakata et al. .................. 709/224 |
| 2004/0162998 | A1 | 8/2004 | Tuomi et al. |
| 2004/0213180 | A1* | 10/2004 | Cho et al. ....................... 370/329 |
| 2004/0247023 | A1* | 12/2004 | Sasai et al. .................... 375/220 |
| 2005/0018686 | A1* | 1/2005 | Igarashi et al. ............. 370/395.2 |
| 2005/0090262 | A1* | 4/2005 | Hamano et al. ............... 455/445 |
| 2005/0176407 | A1 | 8/2005 | Tuomi et al. |
| 2006/0009235 | A1* | 1/2006 | Sheynblat et al. .......... 455/456.1 |
| 2006/0101273 | A1* | 5/2006 | Tan et al. ....................... 713/182 |
| 2008/0195730 | A1* | 8/2008 | Hasegawa et al. ............ 709/224 |

FOREIGN PATENT DOCUMENTS

| WO | 01/17310 | 3/2001 |
| WO | 03/088577 | 10/2003 |

* cited by examiner

*Primary Examiner* — Techane J Gergiso
(74) *Attorney, Agent, or Firm* — Greenblum & Bernstein, P.L.C.

(57) ABSTRACT

A system for automatic security authentication in a wireless network includes a server and a terminal. The terminal includes a processor, a first communications unit, and a second communications unit. The server includes a database, a control unit, and a third communications unit. The processor receives an identification code of an access point through the first communications unit, and sends a message to the control unit through the second communications unit. The message includes the identification code of the access point, a user account and a user password. The control unit sends an authentication code corresponding to the identification code according to data stored in the database to the processor through the third communications unit. After receipt of the authentication code, the processor automatically logs in to the access point through the first communications unit to activate a wireless network access function.

39 Claims, 2 Drawing Sheets

SYSTEM AND METHOD FOR AUTOMATIC SECURITY AUTHENTICATION IN WIRELESS NETWORKS

TECHNICAL FIELD

The invention relates to a system and method for network security authentication, more particularly to a system and method for automatic security authentication in a wireless network.

BACKGROUND ART

When a user wants to use an electronic product, such as a handset having an Internet-access function, to gain wireless access to the Internet, a long string of codes must be manually inputted, such as Wired Equivalent Privacy keys (WEP Keys), to register with an access point so as to be able to use the access point to activate the Internet-access function in an encrypted and protected environment. The purpose of inputting the codes is to activate the encryption mechanism so that hacker attacks or data interception can be avoided when the user accesses the Internet wirelessly.

When the user holding the electronic product moves to an area covered by another access point, the user must register with the new access point. That is, another long string of codes must be inputted in order to activate the Internet-access function through the access point. Therefore, the conventional security authentication mechanism not only requires the user to be familiar with the codes of every access point, the user also needs to input the codes manually, thereby resulting in great inconvenience in use.

For a moving user, he/she may cross areas covered by several access points during the moving process, and may need to input a long string of specific codes upon switching to a new access point. Therefore, some access point administrators set the codes of the access points administered thereby to be the same or even disable the code settings of such access points so that users no longer need to input specific codes in order to minimize user inconvenience. However, regardless of whether the encryption mechanism is disabled or the access points are set to have the same codes, these are passive methods of handling the above problem, and may result in hacker attacks which will expose users to danger when accessing the Internet wirelessly.

DISCLOSURE OF INVENTION

Therefore, an object of the present invention is to provide a system for automatic security authentication that can automatically obtain and set an authentication code before activating an encrypted wireless network access function.

Another object of the present invention is to provide a method for automatic security authentication that can eliminate manual operation by the user.

Accordingly, a system for automatic security authentication in a wireless network of the present invention includes a server that manages at least one access point, and a terminal. The terminal includes a processor, a first communications unit, and a second communications unit. The server includes a database, a control unit, and a third communications unit.

The first communications unit is connected electrically to and is controlled by the processor, and can receive an identification code issued by the access point and send the identification code to the processor. The second communications unit is connected electrically to and is controlled by the processor, and can transmit data to and receive data from the server.

The database stores a user account and a user password of a terminal, and the identification code and an authentication code of the access point. The control unit is connected electrically to the database. The third communications unit is connected electrically to and is controlled by the control unit, and can transmit data to and receive data from the second communications unit of the terminal.

The method for automatic security authentication used by the authentication system includes the following steps:

(A) enabling the processor of the terminal to receive the identification code issued by the access point through the first communications unit;

(B) enabling the processor to send a message through the second communications unit, and enabling the third communications unit of the server to send the message to the control unit of the server, contents of the message including the identification code of the access point, and the user account and the user password of the terminal;

(C) enabling the control unit of the server to confirm whether the user account and the user password of the terminal as contained in the message are correct according to data stored in the database;

(D) enabling the control unit to send the authentication code corresponding to the identification code to the processor of the terminal through the third communications unit and the second communications unit when the user account and the user password are correct; and (E) enabling the processor to set the authentication code and to automatically log in to the access point through the first communications unit so as to activate a wireless network access function of the first communications unit.

BRIEF DESCRIPTION OF DRAWINGS

Other features and advantages of the present invention will become apparent in the following detailed description of the preferred embodiments with reference to the accompanying drawings, of which.

BEST MODE FOR CARRYING OUT THE INVENTION

Figure 1:
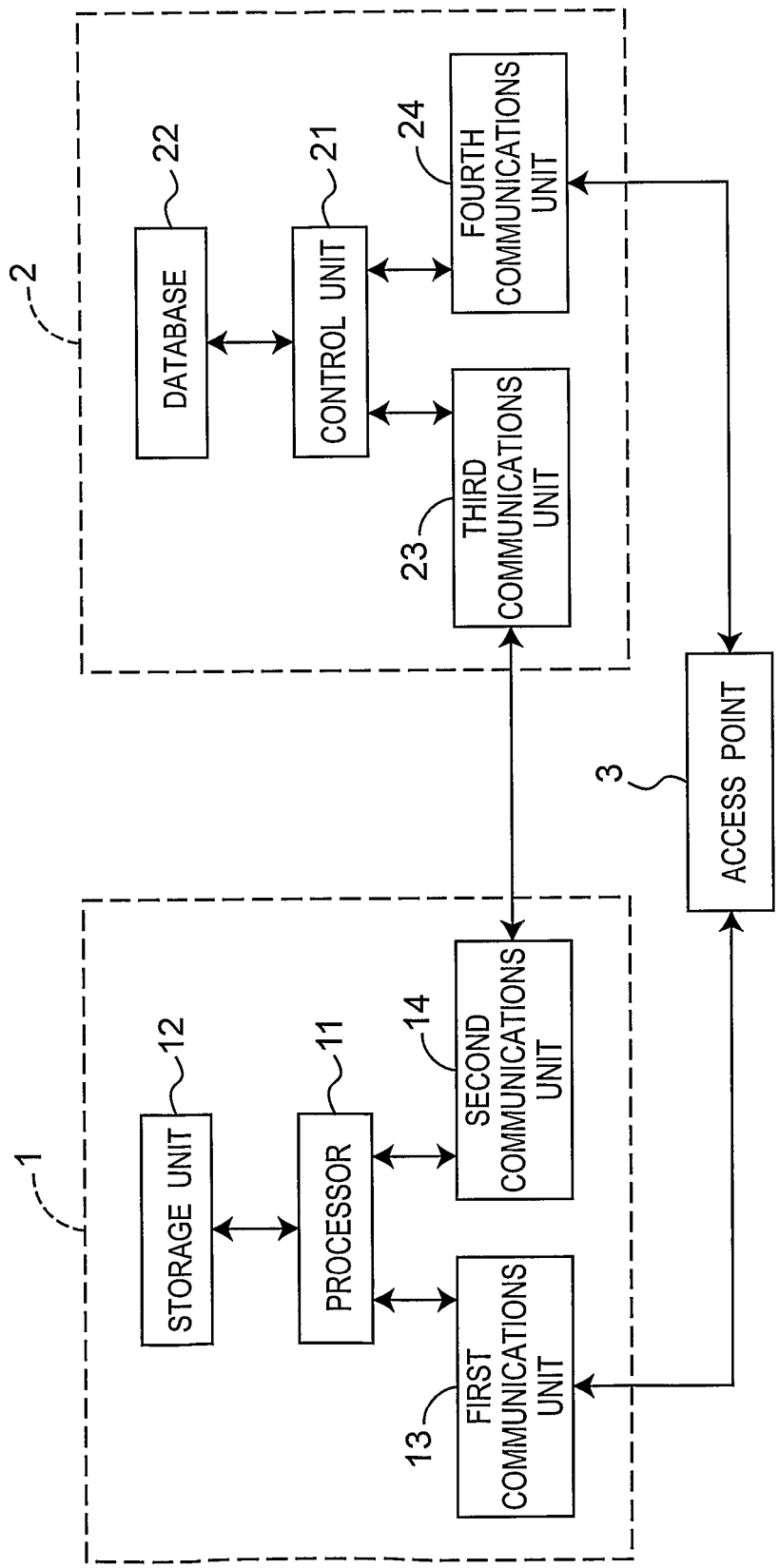
FIG. 1 is a system architecture diagram, illustrating the preferred embodiment of a system for automatic security authentication in a wireless network according to the present invention when connected electrically to an access point.

Referring to FIG. 1, the preferred embodiment of a system for automatic security authentication in a wireless network according to the present invention is shown to include a terminal 1 and a server 2.

The terminal 1 includes a processor 11, a storage unit 12, a first communications unit 13, and a second communications unit 14. The server 2 includes a control unit 21, a database 22, a third communications unit 23, and a fourth communications unit 24.

The control unit 21 of the server 2 is responsible for one or a plurality of access points 3 distributed over a number of places. The database 22 of the server 2 stores an identification code and an authentication code exclusive to each of the access points 3. The identification code represents the identification code (ID) of the corresponding access point 3. The authentication code is the code (e.g., WEP keys) required by the terminal 1 when logging in to the access point 3 under security. In addition, the database 22 also stores a user account and a user password of the terminal 1. The main purpose of storing the user account and password is to check the legitimacy of the user in the future, i.e., to confirm whether the user has the right to use the access point 3.

The storage unit 12 of the terminal 1 can store data. The processor 11 is connected electrically to the storage unit 12, the first communications unit 13, and the second communications unit 14, can search, add, or modify data stored in the storage unit 12, and can selectively send data to or receive data from the outside through the first or second communications unit 13, 14.

The first communications unit 13 of the terminal 1 is controlled by the processor 11. When the position of the terminal 1 is located in an area covered by the access point 3, the first communications unit 13 can receive the identification code issued by the access point 3 and send the identification code to the processor 11.

The second communications unit 14 is also controlled by the processor 11, can send messages transmitted from the processor 11, and can receive the authentication code transmitted from the server 2.

In this embodiment, the second communications unit 14 receives data from the outside or sends data to the outside through the Global System for Mobile Communication (GSM). However, the second communications unit 14 may also receive outside data or send data to the outside using one of a cellular network, such as General Packet Radio Service (GPRS), Third Generation (3G), and Personal Handy Phone System (PHS), Bluetooth, infrared, other wireless networks, a cable network, etc.

After receiving the identification code from the first communications unit 13, the processor 11 commands the second communications unit 14 to send a short message containing the identification code, and the user account and the user password of the terminal 1. After receiving the authentication code from the second communications unit 14, the processor 11 stores the authentication code into the storage unit 12, and automatically sets the authentication code and logs in to the access point 3 through the first communications unit 13 so as to activate the encrypted wireless network access function of the first communications unit 13.

The third communications unit 23 of the server 2 adopts the same technique as the second communications unit 14 of the terminal 1 to receive data from and send data to the outside, and permits data transmission to and from the second communications unit 14. The fourth communications unit 24 of the server 2 receives data from and sends data to the outside using a wireless network or a wired network. The aforesaid data transmission will be protected by the existing security mechanism of the selected communications technique or additionally with the protection of an appropriate data encryption technique so as to ensure security of data transmission.

The control unit 21 of the server 2 is connected electrically to the database 22, the third communications unit 23, and the fourth communications unit 24, and can search, add or modify the data stored in the database 22. Moreover, the control unit 21 can control and manage the access points 3 registered in the database 22, and can change the authentication codes of the access points 3 through the fourth communications unit 24 and simultaneously update the corresponding authentication codes in the database 22 so that, through continuously setting new codes, prevention of hackers breaking the authentication codes or leakage of the authentication codes can be achieved.

After the control unit 21 has received a short message, e.g., a message in the form of SMS (Short Message Service), IM (Instant Message), or any other form of message, from the terminal 1 through the third communications unit 23, the control unit 21 will search the data in the database 22 and, after confirming the user account and password of the terminal 1, send the authentication code corresponding to the identification code of the access point 3 in the short message to the second communications unit 14 of the terminal 1 through the third communications unit 23.

Figure 2:
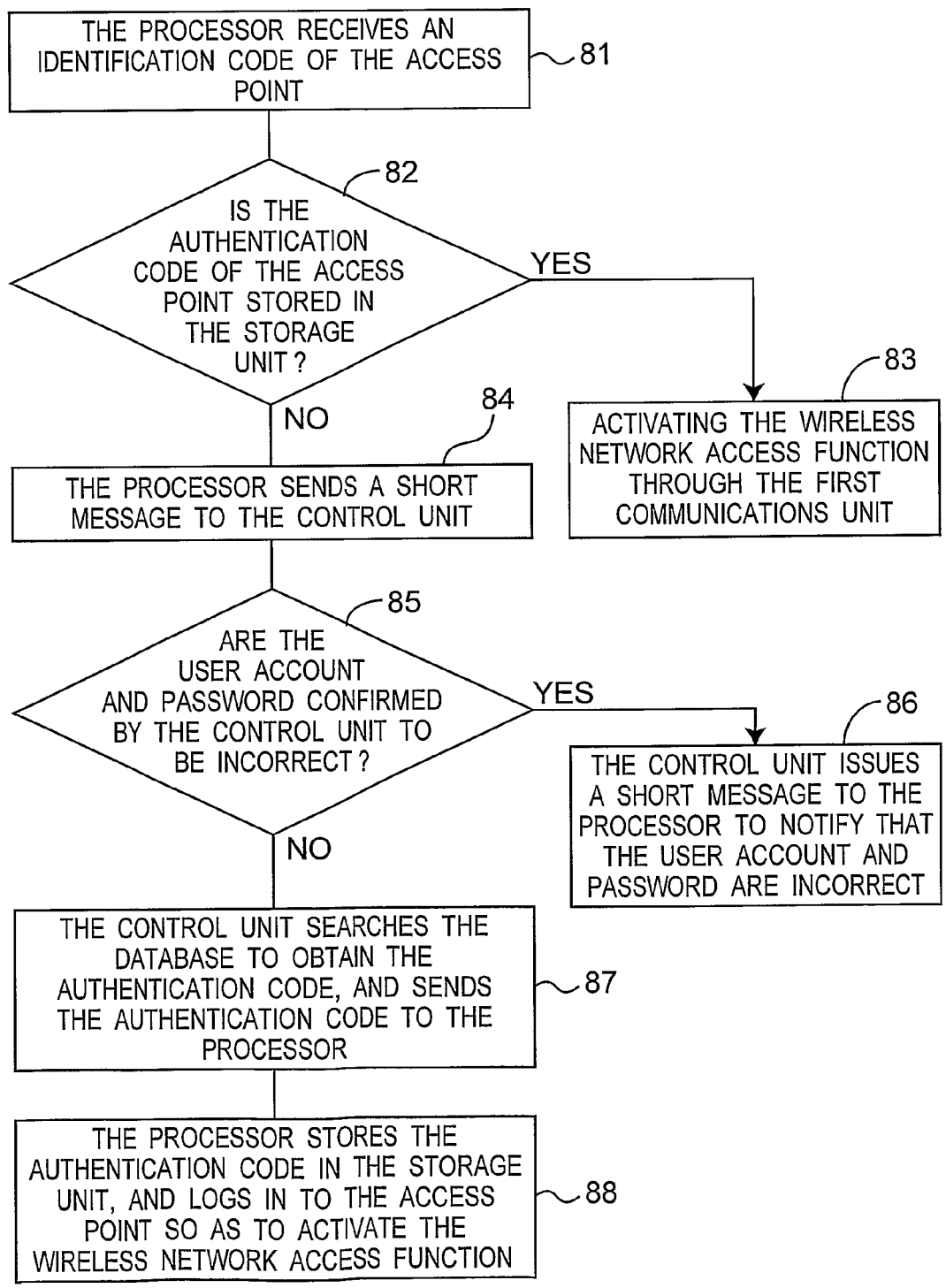
FIG. 2 is a flowchart of a method of the preferred embodiment.

As shown in FIGS. 1 and 2, when the access point 3 administered by the server 2 is detected by the terminal 1, the method of automatic security authentication in a wireless network according to this invention includes the following steps:

In step 81, the processor 11 of the terminal 1 receives the identification code of the access point 3 through the first communications unit 13.

In step 82, the processor 11 searches data in the storage unit 12 to inspect whether the authentication code of the access point 3 corresponding to the identification code is already stored in the storage unit 12. If the authentication code is present in the storage unit 12, the flow proceeds to step 83. Otherwise, the flow skips to step 84.

In step 83, the processor 11 automatically logs in to the access point 3 using the authentication code, and activates the wireless network access function through the first communications unit 13.

In step 84, the processor 11 issues a short message through the second communications unit 14, and the short message is sent to the control unit 21 of the server 2 through the third communications unit 23 of the server 2. The short message contains the identification code of the access point 3, and the user account and password of the terminal 1.

In step 85, the control unit 21 of the server 2 confirms whether the user account and the user password of the terminal 1 are incorrect according to the data stored in the database 22. If incorrect, the flow proceeds to step 86. Otherwise, the flow skips to step 87.

In step 86, the control unit 21 issues another short message through the third communications unit 23, and the short message is sent to the processor 11 through the second communications unit 14 of the terminal 1. The contents of the short message are to notify the user of the terminal 1 that the user account and password are incorrect.

In step 87, the control unit 21 searches the database 22 to obtain the authentication code corresponding to the identification code of the access point 3 as contained in the short message, and sends the authentication code to the processor 11 of the terminal 1 through the third communications unit 23 and the second communications unit 14 of the terminal 1.

In step 88, upon receiving the authentication code, the processor 11 stores the authentication code in the storage unit 12, sets the authentication code, and automatically logs in to the access point 3 through the first communications unit 13 so as to activate the encrypted wireless network access function of the first communications unit 13.

In this embodiment, the terminal 1 can be made in the form of a handset, which has general functions of telephone communications and sending messages, as well as wireless network access functions. However, before activating wireless network access, the handset is required to perform the aforementioned automatic security setting internally.

It is noted that, in this embodiment, although the second communications unit 14 adopts the GSM system, as mentioned hereinabove, the second communications unit 14 also adopts the same wireless network technique as the first communications unit 13 to communicate with the outside. In this case, although the terminal 1 of this embodiment can already use the second communications unit 14 for wireless network access, in view of reasons like a company (A) providing such service to the second communications unit 14 supplies narrower network bandwidth or an inferior connection quality, the user of the terminal 1 may still want to switch to another company (B), which provides better service to the first communications unit 13, to connect to the Internet wirelessly. Therefore, the aforesaid security setting process is also required in such case. Under this circumstance, in steps 84 and 86, the server 2 and the terminal 1 may send messages not only by sending short messages but also by electronic mails, instant messages, etc.

In addition, it is noted that the terminal 1 of this invention may exclude the storage unit 12. Thus, steps 82 and 83 of the method according to this invention do not need to be executed. Besides, in step 88, it is not required to store the authentication code into the storage unit 12. Therefore, under this circumstance, when the processor 11 detects an access point 3 that has been used previously, it is still necessary to inquire of the control unit 21 about the authentication code of that access point 3.

In sum, in the system and method for automatic security in a wireless network according to this invention, when the identification code of the access point 3 is received, the control unit 21 of the server 2 can immediately obtain the authentication code of the access point 3 and automatically set the authentication code so as to smoothly activate the encrypted wireless access function, and can, when the authentication code is changed, perform corresponding dynamic updating. Thus, the task of manually inputting the authentication code of the access point 3 in the prior art can be automatically performed by the system in this invention.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

INDUSTRIAL APPLICABILITY

The present invention is applicable to a system and a method for automatic security authentication in wireless networks.

The invention claimed is:

1. A system for automatic security authentication in a wireless network, comprising a server managing at least one access point, and a terminal;
said terminal including:
a processor;
a first communicator connected electrically to and controlled by said processor, and configured to receive an identification code issued by the access point and send the identification code to said processor; and
a second communicator connected electrically to and controlled by said processor, and configured to transmit data to and receive data from said server,
said server including:
a database storing a user account and a user password of said terminal, and the identification code and an authentication code of the access point;
a controller connected electrically to said database; and
a third communicator connected electrically to and controlled by said controller, and configured to transmit data to and receive data from said second communicator of said terminal;
wherein, after said processor of said terminal has received the identification code from said first communicator, said processor sends a message containing the identification code, and the user account and the user password of said terminal to said third communicator of said server through said second communicator, said third communicator sending the message to said controller, said controller searching data in said database according to contents of the message and, after confirming the user account and the user password of said terminal, sending the authentication code corresponding to the identification code to said second communicator of said terminal through said third communicator, said processor setting the authentication code after receiving the authentication code from said second communicator, and automatically logging in to the access point through said first communicator so as to activate a wireless network access function of said first communicator, and
wherein said server further includes a fourth communicator, said controller being configured to control the access point through said fourth communicator so as to modify the authentication code of the access point and to concurrently modify the corresponding authentication code in said database.

2. The system for automatic security authentication in a wireless network according to claim 1, wherein said terminal further includes a storage connected electrically to said processor and configured to store data such that said processor stores the authentication code into said storage upon receipt of the authentication code, and said processor thereafter can directly obtain the authentication code of the access point by searching said storage.

3. The system for automatic security authentication in a wireless network according to claim 1, wherein said controller may add, delete or modify the data in said database.

4. The system for automatic security authentication in a wireless network according to claim 1, wherein said second communicator and said third communicator transmit data to each other using a cellular network technique, and the message is in the form of a short message.

5. The system for automatic security authentication in a wireless network according to claim 1, wherein said second communicator and said third communicator transmit data to each other through a wireless network.

6. The system for automatic security authentication in a wireless network according to claim 5, wherein the message is in the form of an electronic mail.

7. The system for automatic security authentication in a wireless network according to claim 5, wherein the message is in the form of an instant message.

8. The system for automatic security authentication in a wireless network according to claim 1, wherein said second communicator and said third communicator transmit data to each other through a cable network.

9. The system for automatic security authentication in a wireless network according to claim 8, wherein the message is in the form of an electronic mail.

10. The system for automatic security authentication in a wireless network according to claim 8, wherein the message is in the form of an instant message.

11. A terminal adapted for data transmission with a server that manages at least one access point, the server having a user account and a user password of said terminal and an identification code and an authentication code of the access point stored therein, said terminal comprising:
- a processor;
- a first communicator connected electrically to and controlled by said processor, and configured to receive the identification code issued by the access point and send the identification code to said processor; and
- a second communicator connected electrically to and controlled by said processor, and configured to transmit data to a third communicator of the server and receive data from the server;
- said processor generating a message after receiving the identification code from said first communicator, contents of the message including the identification code, and the user account and the user password of said terminal, said processor sending the message to the server through said second communicator, and receiving the authentication code sent back by the server through said third communicator of the server and said second communicator of the terminal, said processor setting the authentication code after receiving the authentication code and automatically logging in to the access point through said first communicator so as to activate a wireless network access function of said first communicator, and
- wherein the server further includes a fourth communicator and a database, enabling the server to be connected to the access point through the fourth communicator so as to modify the authentication code of the access point and to concurrently modify the corresponding authentication code in the database.

12. The terminal according to claim 11, further comprising a storage connected electrically to said processor and configured to store data such that said processor stores the authentication code into said storage upon receipt of the authentication code, and thereafter can obtain the authentication code of the access point by searching said storage.

13. The terminal according to claim 11, wherein said second communicator transmits data to and receives data from the server using a cellular network technique, and the message is in the form of a short message.

14. The terminal according to claim 11, wherein said second communicator transmits data to and receives data from the server using a wireless network.

15. The terminal according to claim 14, wherein the message is in the form of an electronic mail.

16. The terminal according to claim 14, wherein the message is in the form of an instant message.

17. The terminal according to claim 11, wherein said second communicator communications unit transmits data to and receives data from the server using a cable network.

18. The terminal according to claim 17, wherein the message is in the form of an electronic mail.

19. The terminal according to claim 17, wherein the message is in the form of an instant message.

20. A server that manages at least one access point and that is adapted for data transmission with a terminal, said server comprising:
- a database storing a user account and a user password of the terminal, and an identification code and an authentication code of the access point;
- a controller connected electrically to said database; and
- a third communicator connected electrically to and controlled by said controller, and configured to transmit data to a second communicator of the terminal and receive a message from the terminal, contents of the message including the identification code received by the terminal though a first communicator from the access point, and the user account and the user password of the terminal,
- said controller searching data in said database after receipt of the message received by said third communicator and, after confirming the user account and the user password of the terminal in the contents of the message to be correct, commanding said third communicator to transmit the authentication code corresponding to the identification code of the access point to the terminal, and
- a fourth communicator, said controller being configured to control the access point through said fourth communicator so as to modify the authentication code of the access point and to concurrently modify the corresponding authentication code in said database.

21. The server according to claim 20, wherein said controller control unit may add, delete or modify the data in said database.

22. The server according to claim 20, wherein said third communicator transmits data to and receives data from the terminal using a cellular network technique, and the message is in the form of a short message.

23. The server according to claim 20, wherein said third communicator transmits data to and receives data from the terminal through a wireless network.

24. The server according to claim 23, wherein the message is in the form of an electronic mail.

25. The server according to claim 23, wherein the message is in the form of an instant message.

26. The server according to claim 20, wherein said third communicator transmits data to and receives data from the terminal through a cable network.

27. The server according to claim 26, wherein the message is in the form of an electronic mail.

28. The server according to claim 26, wherein the message is in the form of an instant message.

29. A method for automatic security authentication in a wireless network, said method being adapted for use in association with a terminal and a server, the terminal including a processor, a first communicator, and a second communicator, the server including a database, a controller, a third communicator, and a fourth communicator, the database storing an identification code and an authentication code of at least one access point, and a user account and a user password of the terminal, said method comprising:
- enabling the processor of the terminal to receive the identification code issued by the access point through the first communicator;
- enabling the processor to send a message through the second communicator and enabling the third communicator of the server to send the message to the controller of the server, contents of the message including the identification code of the access point, and the user account and the user password of the terminal;
- enabling the controller of the server to confirm whether the user account and the user password of the terminal as contained in the message are correct according to data stored in the database;
- if the user account and the user password are correct, the controller sending the authentication code corresponding to the identification code to the processor of the terminal through the third communicator and the second communicator;
- the processor setting the authentication code and automatically logging in to the access point through the first communicator so as to activate a wireless network access function of the first communicator; and enabling the server to be connected to the access point through the fourth communicator so as to modify the authentication code of the access point and to concurrently modify the corresponding authentication code in the database.

30. The method for automatic security authentication in a wireless network according to claim 29, further comprising: enabling the controller to issue a new message to the terminal through the third communicator upon determining that the user account and the user password in the message are incorrect so as to notify that the user account and the user password are incorrect.

31. The method for automatic security authentication in a wireless network according to claim 29, wherein the terminal further includes a storage for storing data, said method further comprising: enabling the processor to store the authentication code in the storage.

32. The method for automatic security authentication in a wireless network according to claim 31, further comprising: enabling the processor to search data in the storage upon receipt of the identification code of the access point so as to inspect whether the authentication code corresponding to the identification code has been stored in the storage and, in the affirmative, to set the authentication code and to automatically log in to the access point through the first communicator so as to activate the wireless network access function of the first communicator.

33. The method for automatic security authentication in a wireless network according to claim 29, wherein the second communicator and the third communicator transmit data to each other using a cellular network technique, and the message is in the form of a short message.

34. The method for automatic security authentication in a wireless network according to claim 29, wherein the second communicator and the third communicator transmit data to each other through a wireless network.

35. The method for automatic security authentication in a wireless network according to claim 34, wherein the message is in the form of an electronic mail.

36. The method for automatic security authentication in a wireless network according to claim 34, wherein the message is in the form of an instant message.

37. The method for automatic security authentication in a wireless network according to claim 29, wherein the second communicator and the third communicator transmit data to each other through a cable network.

38. The method for automatic security authentication in a wireless network according to claim 37, wherein the message is in the form of an electronic mail.

39. The method for automatic security authentication in a wireless network according to claim 37, wherein the message is in the form of an instant message.

\* \* \* \* \*

UNITED STATES PATENT AND TRADEMARK OFFICE
CERTIFICATE OF CORRECTION

| | | |
|---|---|---|
| PATENT NO. | : 7,991,161 B2 | Page 1 of 1 |
| APPLICATION NO. | : 11/909177 | |
| DATED | : August 2, 2011 | |
| INVENTOR(S) | : Po-Fei Chen | |

It is certified that error appears in the above-identified patent and that said Letters Patent is hereby corrected as shown below:

At column 7, line 50 (claim 17, line 2), please delete "communications unit" after communicator.

Signed and Sealed this
Thirty-first Day of January, 2012

David J. Kappos
*Director of the United States Patent and Trademark Office*